US009664317B2

(12) United States Patent
Karlsson

(10) Patent No.: US 9,664,317 B2
(45) Date of Patent: May 30, 2017

(54) ARRANGEMENT FOR CONNECTING A PIPE TO A LNG TANK

(71) Applicant: WÄRTSILÄ FINLAND OY, Vaasa (FI)

(72) Inventor: Sören Karlsson, Solf (FI)

(73) Assignee: WARTSILA FINLAND OY, Vaasa (FI)

( * ) Notice: Subject to any disclaimer, the term of this patent is extended or adjusted under 35 U.S.C. 154(b) by 916 days.

(21) Appl. No.: 13/791,004

(22) Filed: Mar. 8, 2013

(65) Prior Publication Data
US 2013/0187374 A1 Jul. 25, 2013

Related U.S. Application Data

(63) Continuation of application No. PCT/FI2011/050758, filed on Sep. 2, 2011.

(30) Foreign Application Priority Data

Sep. 10, 2010  (FI) ..................................... 20105940

(51) Int. Cl.
F16L 23/00 (2006.01)
F17C 1/00 (2006.01)

(52) U.S. Cl.
CPC ............ *F16L 23/003* (2013.01); *F17C 1/002* (2013.01); *F17C 2201/0109* (2013.01);
(Continued)

(58) Field of Classification Search
CPC .............. F17C 1/002; F17C 2203/0629; F17C 2205/0352; F17C 2205/0355; F17C 2205/0361
(Continued)

(56) References Cited

U.S. PATENT DOCUMENTS 2,601,763 A * 7/1952 Peff ................................ 62/48.3
2,776,776 A * 1/1957 Strong et al. .............. 220/560.1
(Continued)

FOREIGN PATENT DOCUMENTS

DE 83 05 747 U1 2/1984
GB 579840 A 8/1946
(Continued)

OTHER PUBLICATIONS

International Search Report (PCT/ISA/210) issued on Dec. 16, 2011, by the Finnish Patent Office as the International Searching Authority for International Application No. PCT/FI2011/050758.
(Continued)

*Primary Examiner* — David E Bochna
(74) *Attorney, Agent, or Firm* — Buchanan Ingersoll & Rooney PC

(57) ABSTRACT

A connection having at least one double-walled pipe of stainless steel connected to an LNG tank is disclosed, the LNG tank having an inner shell of stainless steel and an outer shell spaced at a distance from the inner shell, the inner and outer shells defining an isolation space therebetween. The at least one double-walled pipe includes a common outer wall and at least one inner pipe. The outer wall of the pipe is connected to the inner shell of the tank in such a way that the outer wall and/or a pipe fitting of cold resistant material between the inner shell and the outer wall is arranged to compensate for changes in the length of the outer wall of the pipe and/or of the pipe fitting due to temperature differences between the outer wall of the pipe and the inner shell of the tank.

15 Claims, 6 Drawing Sheets

(52) U.S. Cl.
CPC    *F17C 2201/052* (2013.01); *F17C 2203/0337* (2013.01); *F17C 2203/0341* (2013.01); *F17C 2203/0629* (2013.01); *F17C 2203/0639* (2013.01); *F17C 2203/0643* (2013.01); *F17C 2205/0335* (2013.01); *F17C 2205/0355* (2013.01); *F17C 2205/0367* (2013.01); *F17C 2209/221* (2013.01); *F17C 2209/23* (2013.01); *F17C 2221/033* (2013.01); *F17C 2223/0161* (2013.01); *F17C 2223/033* (2013.01); *F17C 2265/07* (2013.01); *F17C 2270/0105* (2013.01)

(58) Field of Classification Search
USPC .................................................. 285/904, 187
See application file for complete search history.

(56) References Cited

U.S. PATENT DOCUMENTS

| | | | |
|---|---|---|---|
| 3,021,808 A | | 2/1962 | Henry |
| 3,194,591 A | | 7/1965 | Weisend |
| 3,319,979 A | * | 5/1967 | Herold et al. ................ 285/904 |
| 3,446,387 A | * | 5/1969 | Yager ......................... 220/560.1 |
| 3,483,709 A | * | 12/1969 | Sayres et al. ................. 62/51.1 |
| 3,525,228 A | * | 8/1970 | Anderson ..................... 62/51.1 |
| 3,613,934 A | * | 10/1971 | Leonard ..................... 220/560.1 |
| 3,948,411 A | | 4/1976 | Conte |
| 4,510,758 A | | 4/1985 | Tench, Jr. |
| 4,526,015 A | | 7/1985 | Laskaris |
| 4,608,831 A | * | 9/1986 | Gustafson ..................... 62/48.1 |
| 4,838,034 A | * | 6/1989 | Leonard et al. ............... 62/50.2 |
| 4,944,155 A | | 7/1990 | Alexander |
| 5,012,948 A | * | 5/1991 | Van Den Bergh ....... 220/560.05 |
| 5,163,297 A | * | 11/1992 | Yani et al. .................... 62/47.1 |
| 6,029,456 A | * | 2/2000 | Zaiser ........................... 62/45.1 |
| 6,513,837 B2 * | | 2/2003 | Fujikawa et al. ............. 285/904 |
| 7,955,149 B2 * | | 6/2011 | Levander ................ B63B 25/12 440/88 F |
| 8,910,487 B2 * | | 12/2014 | Hylands et al. ............... 62/53.2 |
| 9,206,776 B2 * | | 12/2015 | Bui ........................ B63H 21/12 |
| 2007/0175226 A1 * | | 8/2007 | Karlsson ................. B63J 99/00 62/50.6 |

FOREIGN PATENT DOCUMENTS

| | | |
|---|---|---|
| GB | 800008 A | 8/1958 |
| JP | 8-295394 A | 11/1996 |

OTHER PUBLICATIONS

International Preliminary Report on Patentability (PCT/IPEA/409) Issued on Dec. 12, 2012, by the Finnish Patent Office as the International Searching Authority for International Application No. PCT/FI2011/050758.

Search Report issued on Aug. 9, 2011, by the Finnish Patent Office for Application No. 20105940.

* cited by examiner

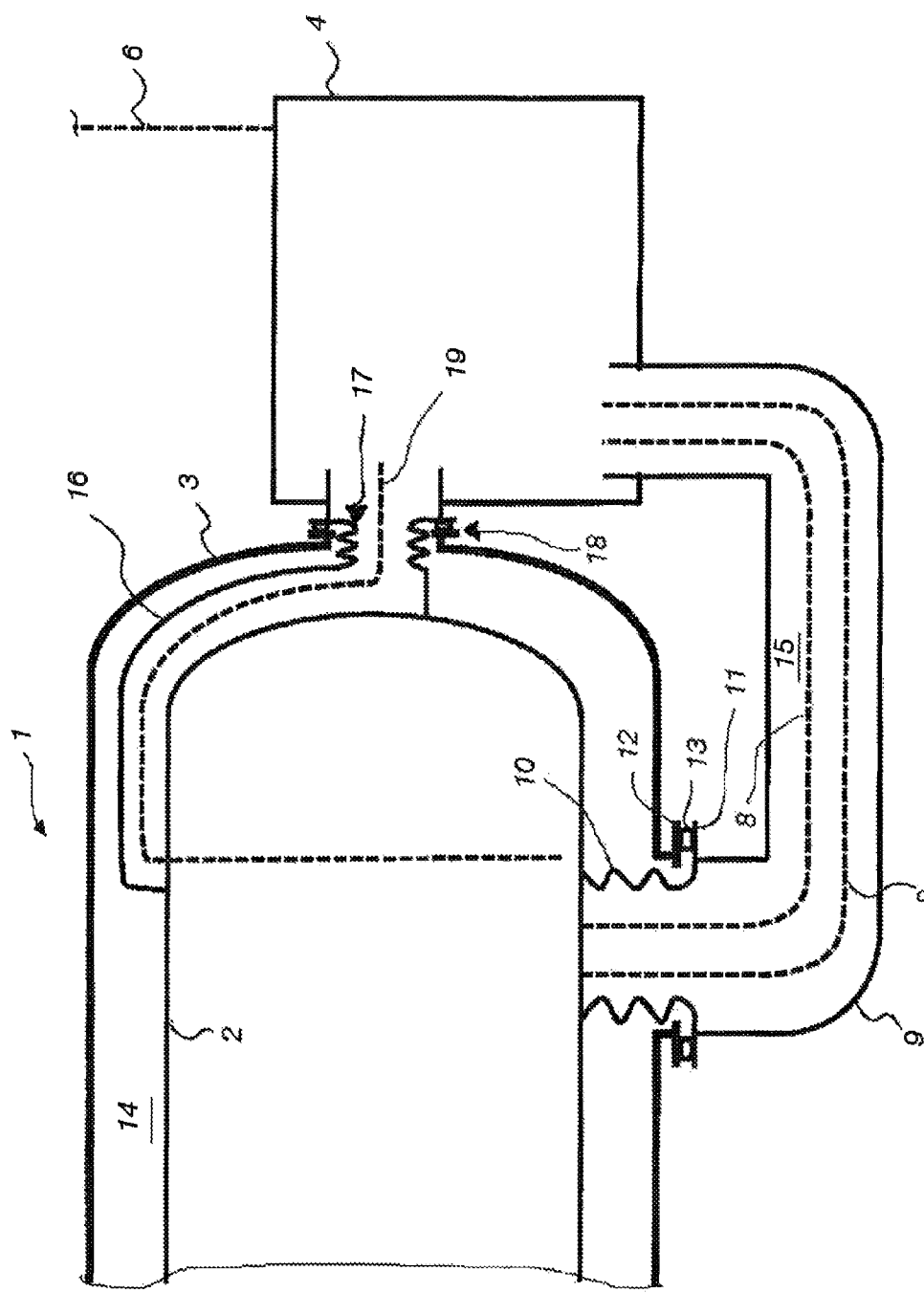

ARRANGEMENT FOR CONNECTING A PIPE TO A LNG TANK

RELATED APPLICATION(S)

This application claims priority as a continuation application under 35 U.S.C. §120 to PCT/FI2011/050758, which was filed as an International application on Sep. 2, 2011 designating the U.S., and which claims priority to Finnish Application No. 20105940 filed in Finland on Sep. 10, 2010. The entire contents of these applications are hereby incorporated by reference in their entireties.

FIELD

The disclosure relates to an arrangement for connecting a double-walled pipe of stainless steel to a (Liquefied Natural Gas (LNG) tank having an inner shell of stainless steel and an outer shell spaced apart from the inner shell, the inner and outer shells defining an isolation space therebetween.

BACKGROUND INFORMATION

The use of LNG (Liquefied Natural Gas) as fuel for marine applications is increasing since it can be an efficient way of cutting emissions. Within the next few decades, natural gas (NG) is expected to become the world's fastest growing major energy source. One of the driving forces behind this development is the depleting known oil reserves, increasing environmental care and the continuous tightening of emission restrictions. Emissions can be reduced to truly form an environmentally sound solution; the reduction in $CO_2$, for example, can be difficult to achieve with oil-based fuels. NG includes methane ($CH_4$) with minor concentrations of heavier hydrocarbons such as ethane and propane. In ambient conditions NG is a gas, but it can be liquefied by cooling it down to about −162° C. In liquid form the specific volume is reduced, which allows a reasonable size of storage tanks relative to energy content. The burning process of NG is clean. In addition, NG has a high hydrogen-to-coal ratio (the highest among the fossil fuels), which can lower $CO_2$ emissions compared with oil-based fuels. When NG is liquefied, all sulphur is removed, which means zero SOX emissions. The clean burning properties of NG can also reduce NOX and particle emissions compared with oil-based fuels. LNG is not only an environmentally sound solution, but can also be economically interesting at today's oil prices.

One way of storing NG in ships is in liquid form. In known ship installations, LNG is stored in cylindrical, double-walled, insulated stainless steel tanks. The tank pressure is defined by the specification of the engines burning the gas and can be less than 5 bar. A higher, for example, a 9 bar, tank design pressure can be selected due to the natural boil-off phenomenon.

FIG. 1 discloses schematically a known LNG installation for a ship 20. LNG is stored in a cylindrically shaped pressurized storage tank 1. The tank includes a stainless steel inner shell, which is designed for an internal pressure, and an outer shell that acts as a secondary barrier. The outer shell can be made of either stainless steel or carbon steel. The tank is insulated with perlite/vacuum. Reference numeral 24 denotes a bunkering station from which LNG is led to the tank 1 via insulated pipes. The tank room 4 is a stainless steel barrier welded to the outer vessel of the tank 1. The tank room acts as a barrier that can avoid damage to the external compartments, and can facilitate ventilation of the evaporated gas. The LNG from the tank is evaporated and fed via a gas valve unit 21 to the engines. The main engine generators are denoted by 22 and the switch gear by 23. FIG. 1 is only to show an exemplary schematic arrangement for a LNG installation and, therefore, there is no detailed explanation of a control system, thrusters, propulsion units or other implementation features of ships.

NG can be a safe fuel when the right precautions are taken.

In a liquid state, LNG is not explosive, nor is it corrosive or toxic. Thus, possible spillages will not cause any lasting contamination, as the liquid will boil to gas. The low temperature, however, is an issue when considering normal ship steel, but this problem can be avoided by using appropriate materials in LNG systems.

Gaseous NG is lighter than air, which means that in case of a leakage, the gas will disperse upwards and not build up in the ship's bilge. The ignition temperature of NG is relatively high (600° C.) compared with diesel oil (250° C.), and NG is flammable only within a small concentration range between 5% and 15% of air.

The gas fuel system of a ship can include liquid storage tanks, a vaporiser, a gas valve unit, piping and a bunkering system.

The storage tank and associated valves and piping should be located in a space designed to act as a second barrier in case of liquid or compressed gas leakage. The material of the bulkheads of this space should have the same design temperature as the gas tank, and the space should be designed to withstand the maximum pressure build-up or alternatively, pressure relief venting to a safe location (mast) may be provided. The space should be capable of containing a leakage and be thermally isolated so that the surrounding hull is not exposed to unacceptable cooling in case of a leakage of liquid or compressed gas.

The natural gas is delivered to the engines as a gas but stored as a liquid. A "tank room" is associated with a storage tank and contains the equipment to convert the liquid into a gas for safe delivery to the engines. The tank room is also considered a "secondary barrier" since liquid pipes are inside it.

The piping between the LNG tank and the tank room can be double-walled and the pipes are arranged to go through the outer shell of the LNG tank and pass into the space between the inner and outer shells of the LNG tank before they are connected to the inner shell, for example, by welding. This arrangement is functional as such, but can also require that the outer shell of the LNG tank is made of stainless steel since all connections to the inner shell should be inside a stainless steel cover.

SUMMARY

A connection arrangement disclosed, comprising: at least one double-walled pipe of stainless steel; an LNG tank having an inner shell of stainless steel and an outer shell spaced at a distance from the inner shell; and at least one connection between the at least one double-walled pipe and the LNG tank, the inner and outer shells of the LNG tank defining an isolation space therebetween, wherein the at least one double-walled pipe includes an outer wall and at least one inner pipe, wherein the at least one connection is arranged for connecting the outer wall of the pipe to the inner shell of the tank by a pipe fitting of a cold resistant material arranged between the inner shell and the outer wall to compensate for changes in a length of the outer wall of the pipe and/or for changes in a length of the pipe fitting caused by temperature differences between the outer wall of the pipe and the inner shell of the tank, the pipe fitting being formed as a bellows-like structure, and wherein the at least one connection connects the pipe fitting to an interface between the outer shell of the tank and the outer wall of the pipe, and comprises: a first connection flange arranged at an end of the outer wall of the pipe facing the inner shell of the tank; an outwardly extending second connection flange formed at a pipe inlet opening in the outer shell of the tank; and at least one of a heat insulation and a sealing member arranged between the first and second connection flanges, and wherein the outer wall of the pipe is connected to the LNG tank as a second barrier in case of a liquid and/or a compressed gas leakage.

A connection arrangement in combination with a ship engine is disclosed, comprising: at least one double-walled pipe of stainless steel; an LNG tank having an inner shell of stainless steel and an outer shell spaced at a distance from the inner shell; at least one connection between the at least one double-walled pipe and the LNG tank, the inner and outer shells of the LNG tank defining an isolation space therebetween, wherein the at least one double-walled pipe includes an outer wall and at least one inner pipe, wherein the at least one connection is arranged for connecting the outer wall of the pipe to the inner shell of the tank by a pipe fitting by of a cold resistant material arranged between the inner shell and the outer wall to compensate for changes in a length of the outer wall of the pipe and/or for changes in a length of the pipe fitting caused by temperature differences between the outer wall of the pipe and the inner shell of the tank, the pipe fitting being formed as a bellows-like structure, and wherein the at least one connection connects the pipe fitting to an interface between the outer shell of the tank and the outer wall of the pipe, and comprises: a first connection flange arranged at an end of the outer wall of the pipe facing the inner shell of the tank; an outwardly extending second connection flange formed at a pipe inlet opening in the outer shell of the tank; and at least one of a heat insulation and a sealing member arranged between the first and second connection flanges, and wherein the outer wall of the pipe is connected to the LNG tank as a second barrier in case of a liquid and/or a compressed gas leakage in associated valves and piping; and a tank room in fluid connection with the LNG tank via the at least one double-walled pipe, for converting LNG into a gas for delivery to an engine.

BRIEF DESCRIPTION OF THE DRAWINGS

Exemplary embodiments will be disclosed more closely with reference to the accompanying drawings in which:

FIG. 6 is a schematic vertical cross-section of a part of a LNG tank and a tank room associated therewith according to an exemplary embodiment of the disclosure.

DETAILED DESCRIPTION

The present disclosure encompasses an improved solution for connecting pipes to the LNG tank. In accordance with an exemplary embodiment, an arrangement is disclosed for connecting at least one double-walled pipe of stainless steel to a LNG tank having an inner shell of stainless steel and an outer shell spaced at a distance from the inner shell, the inner and outer shells defining an isolation space therebetween. The at least one double-walled pipe includes a common outer wall and at least one inner pipe, wherein the outer wall of the pipe is connected to the inner shell of the tank by a pipe fitting in such a way that the pipe fitting of cold resistant material between the inner shell and the outer wall is arranged to compensate for changes in the length of the outer wall of the pipe and/or of the pipe fitting due to temperature differences between the outer wall of the pipe and the inner shell of the tank. In accordance with an exemplary embodiment, the pipe fitting can be formed as a bellows-like structure, wherein at the end of the outer wall of the pipe facing the inner shell of the tank is arranged a first connection flange. In accordance with an exemplary embodiment, a pipe inlet opening formed in the outer shell of the tank forms an outwardly extending second connection flange, and between the first and second connection flanges is arranged a heat insulation and/or a sealing member.

In accordance with an exemplary embodiment, for example, the bellows can be connected by welding to the outer wall of the pipe and to the inner shell of the tank.

By using a bellows of stainless steel as a pipe fitting between the inner shell of the LNG tank and the outer wall of the pipe it is possible to absorb relative movement in the piping system due to difference in temperature between the outer wall of the pipe and the inner shell of the tank. The materials utilized for the bellows are stainless steels, for example, austenitic type steels.

Figure 1:
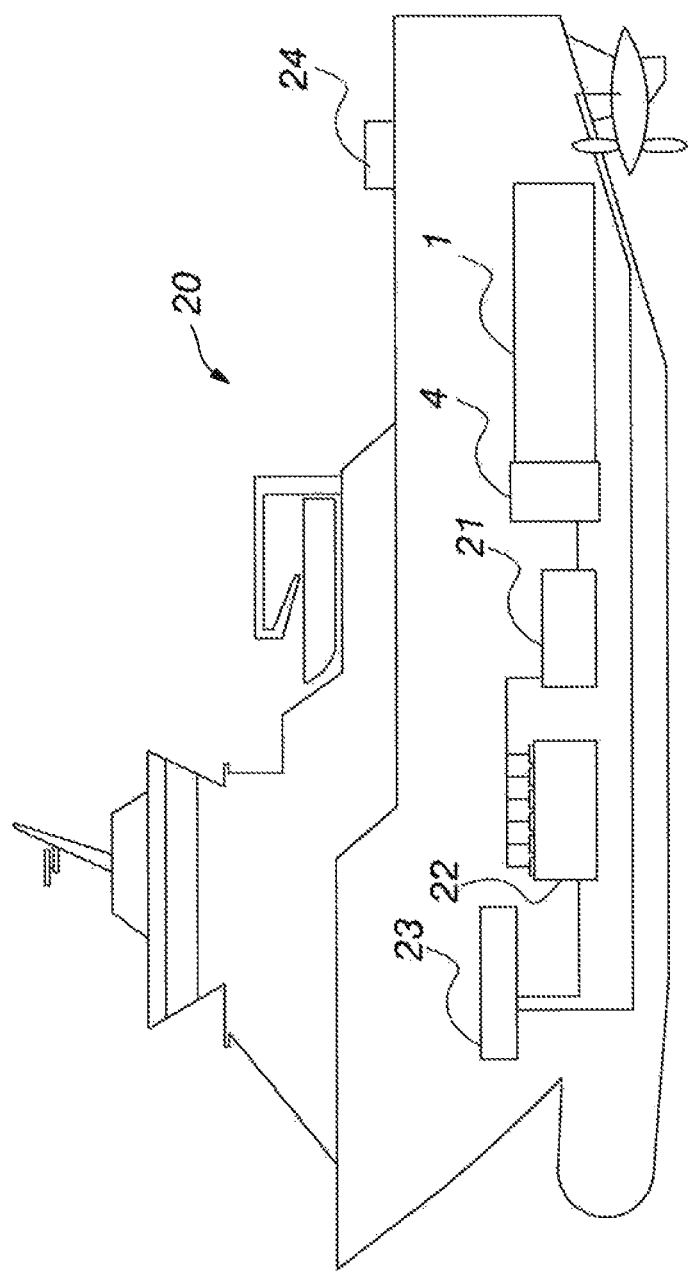
FIG. 1 is a schematic vertical cross-section of a ship using LNG as fuel.
Figure 2:
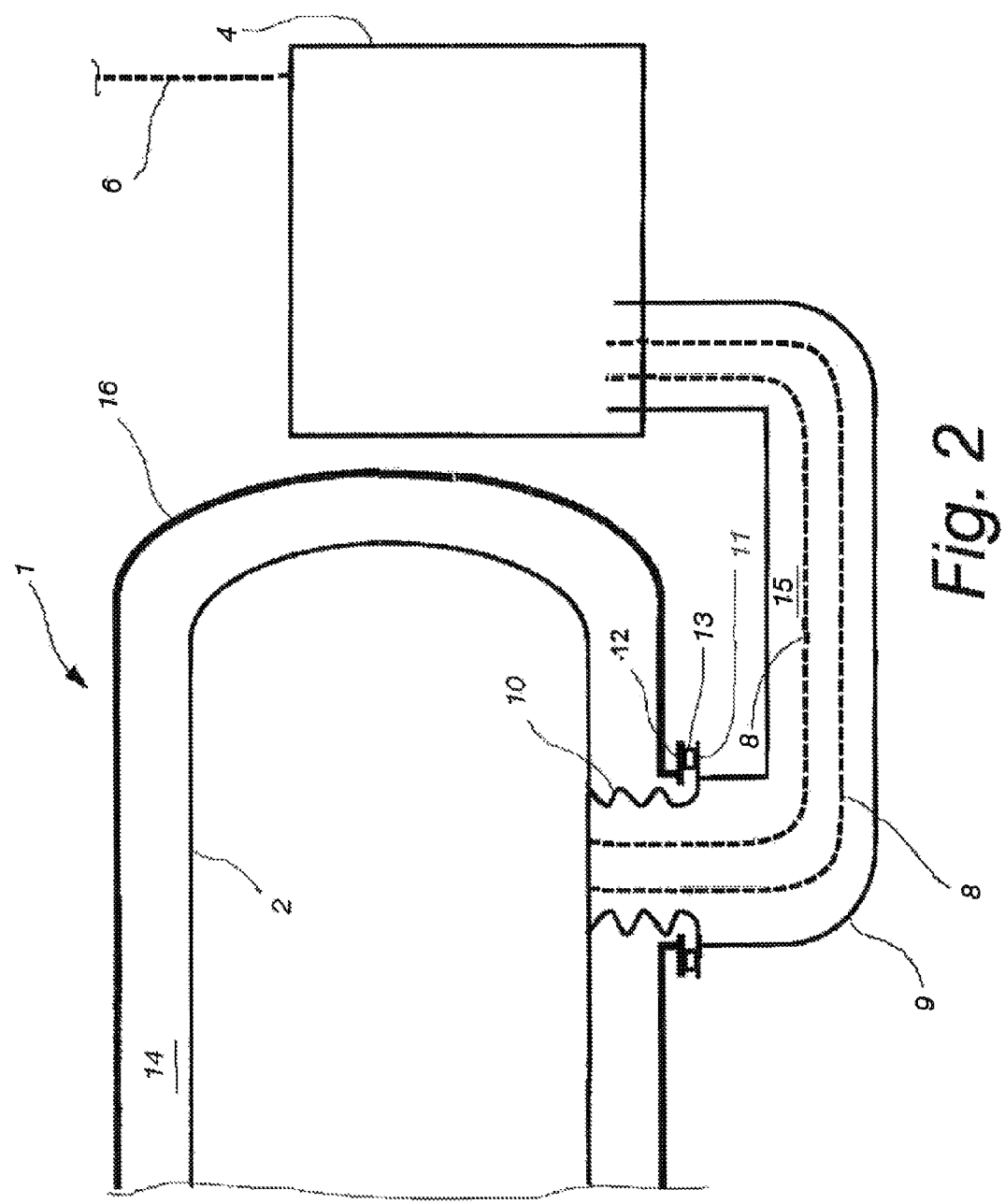
FIG. 2 is a schematic vertical cross-section of a part of an exemplary LNG tank and an exemplary tank room associated therewith according to an exemplary embodiment of the disclosure.
Figure 3:
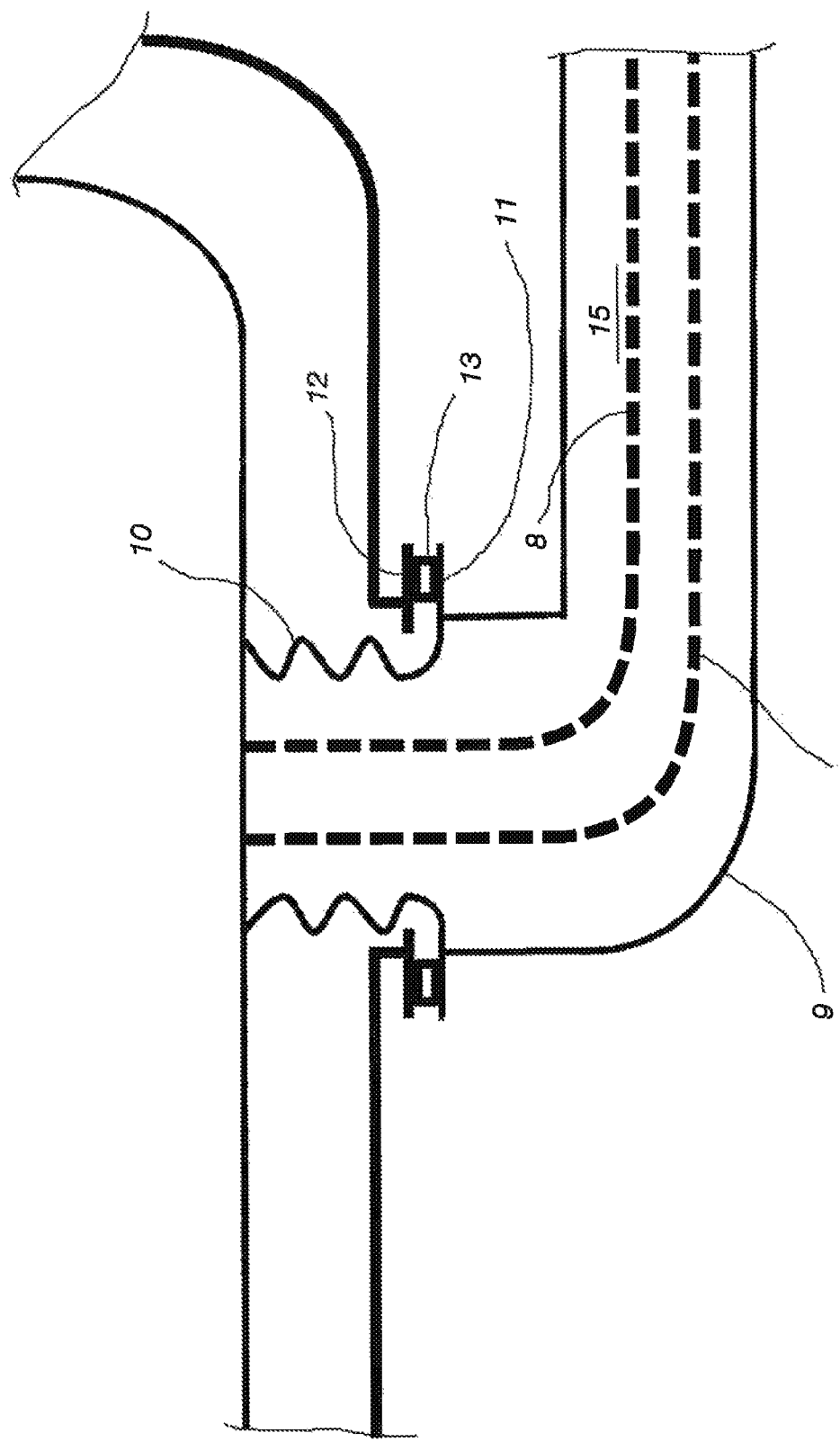
FIG. 3 is an enlarged view of a part of FIG. 2 showing details of the pipe penetration into the tank.

Referring to FIG. 2, a LNG tank 1 is disclosed, which includes an inner shell 2 and an outer shell 3 defining an isolation space 14 therebetween. In accordance with an exemplary embodiment, the isolation space 14 is under vacuum and/or filled with isolation material, such as perlite or vermiculite. A tank room 4, containing the equipment (not shown) for converting the liquid into a gas for safe delivery to the engines, is associated with the tank 1, the equipment being in fluid connection with the tank via double-walled pipes to the tank. In the schematic FIGS. 2 and 3 is shown two inner pipes 8 and a common outer wall 9 therefore. The inner pipes 8 are spaced apart from each other as well from the outer wall 9 defining an isolation space 15 therebetween. The isolation space 15 is, similarly to the isolation space 14 of the tank 1, under vacuum and/or filled with isolation material, such as perlite or vermiculite. At one end, the pipes 8 and the outer wall 9 penetrate the tank room and extends a length inside thereof. At its other end, the common outer wall 9 of the pipes is provided with a first connection flange 11 to which a bellows 10 is connected by welding. The bellows 10 can be welded at its other end to the inner shell 2 of the tank 1. The inner pipes 8 can be welded directly to the inner shell 2 of the tank. The outer shell 3 of the tank can be provided with a feedthrough opening for the pipe and along the peripheral of the opening with a second connection flange 12 extending outwardly from the outer shell 3. The first and second connection flanges can be aligned and provided with an isolation and/or sealing member 13 therebetween. The bellows 10 and inner pipes 8 and outer wall 9 can be of cold resistant materials, for example, stainless steels, but the material for the outer shell 3 of the tank 1 may be carbon steel due to the use of the protective bellows of stainless steel around the pipe feedthrough to the inside of the tank. In accordance with an exemplary embodiment, the use of carbon steel for the outer shell can reduce the manufacturing costs.

Figure 4:
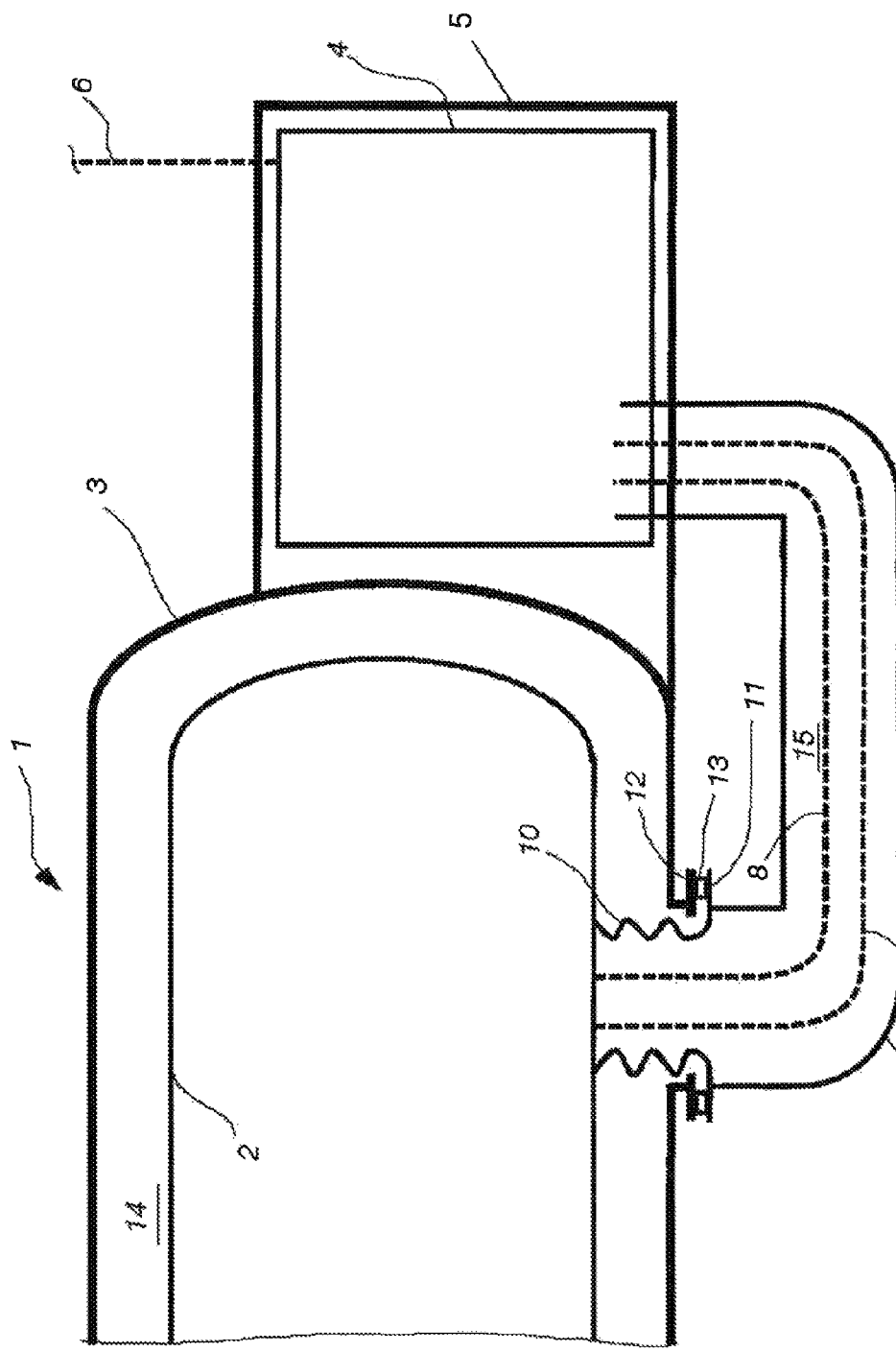
FIG. 4 is a schematic vertical cross-section of a part of an exemplary LNG tank and an exemplary tank room associated therewith according to an exemplary embodiment of the disclosure.

In an exemplary embodiment, FIG. 4 shows an additional shell structure of carbon steel around the tank room 4 to give added stiffness and to facilitate mounting. The additional shell structure can also provide enhanced protection for the tank room environment.

Figure 5:
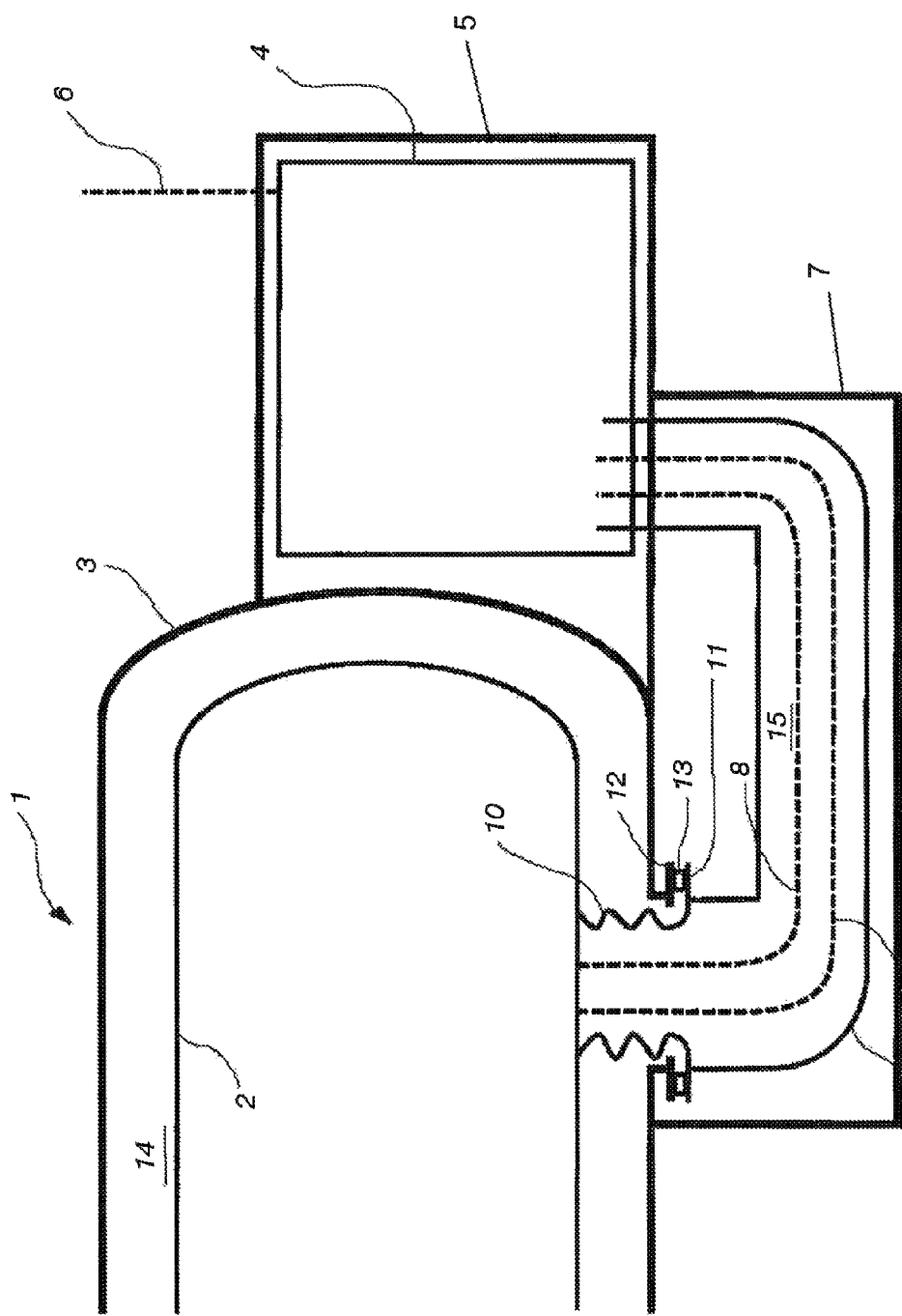
FIG. 5 is a schematic vertical cross-section of a part of a LNG tank and a tank room associated therewith according to an exemplary embodiment of the disclosure.

In an exemplary embodiment, FIG. 5 shows an additional lower shell structure 7 of carbon steel, which gives increased protection for the pipe.

In an exemplary embodiment, as shown in FIG. 6, a pipe 19 for a top connection can be located in a pipe trunk 16 extending to the center of the tank. The pipe trunk 16 is connected to the outer shell 3 of the tank 1 via bellows 17 by a similar flange arrangement 18 as for the bellows 10 comprising flanges 11 and 12 and an isolation and/or sealing member 13 therebetween. The exemplary embodiment of FIG. 6 can be provided also with similar additional shell structures 5 and/or 7 as shown in FIGS. 4 and 5. The pipe 19 and pipe trunk 16 are also of cold resistant materials, for example, stainless steels.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A connection arrangement, comprising:
    at least one double-walled pipe of stainless steel;
    an LNG tank having an inner shell of stainless steel and an outer shell spaced at a distance from the inner shell;
    at least one connection between the at least one double-walled pipe and the LNG tank; and
    a tank room in fluid connection with the LNG tank via the at least one double-walled pipe,
    wherein the inner and outer shells of the LNG tank define an isolation space therebetween, wherein the double-walled pipe includes an outer wall and at least one inner pipe, wherein the at least one connection is arranged for connecting the outer wall of the pipe to the inner shell of the tank by a pipe fitting of a cold resistant material arranged between the inner shell and the outer wall to compensate for changes in a length of the outer wall of the pipe and/or for changes in a length of the pipe fitting caused by temperature differences between the outer wall of the pipe and the inner shell of the tank, and wherein the at least one connection connects the pipe fitting to an interface between the outer shell of the tank and the outer wall of the pipe, and wherein the outer wall of the pipe is connected to the LNG tank as a second barrier in case of a liquid and/or compressed gas leakage, and the arrangement comprises a tank room in fluid connection with the LNG tank via the at least one double-walled pipe.

2. The arrangement of claim 1, wherein a material of the outer wall and/or pipe fitting is a cold resistant stainless steel.

3. The arrangement of claim 1, wherein the outer shell of the tank is carbon steel.

4. The arrangement of claim 1, wherein the tank room is configured to convert LNG into an engine gas.

5. The arrangement of claim 1, wherein the isolation space between the inner and outer shells of the LNG tank is under vacuum and/or filled with an isolation material.

6. The arrangement of claim 5, wherein the isolation material is perlite or vermiculite.

7. The arrangement of claim 1, comprising:
    an isolation space between the outer wall and the inner wall of the at least one double-walled pipe of stainless steel, and wherein the isolation space of the double-walled pipe is under vacuum and/or filled with an isolation material.

8. The arrangement of claim 7, wherein the isolation material is perlite or vermiculite.

9. A connection arrangement in combination with a ship engine, comprising:
    at least one double-walled pipe of stainless steel;
    an LNG tank having an inner shell of stainless steel and an outer shell spaced at a distance from the inner shell;
    at least one connection between the at least one double-walled pipe and the LNG tank, the inner and outer shells of the LNG tank defining an isolation space therebetween, wherein the at least one double-walled pipe includes an outer wall and at least one inner pipe, wherein the at least one connection is arranged for connecting the outer wall of the pipe to the inner shell of the tank by a pipe fitting by of a cold resistant material arranged between the inner shell and the outer wall to compensate for changes in a length of the outer wall of the pipe and/or for changes in a length of the pipe fitting caused by temperature differences between the outer wall of the pipe and the inner shell of the tank, and wherein the at least one connection connects the pipe fitting to an interface between the outer shell of the tank and the outer wall of the pipe,
    and wherein the outer wall of the pipe is connected to the LNG tank as a second barrier in case of a liquid and/or a compressed gas leakage in associated valves and piping; and
    a tank room in fluid connection with the LNG tank via the at least one double-walled pipe for converting LNG into a gas for delivery to an engine.

10. The arrangement of claim 9, wherein the material of the outer wall and/or pipe fitting is a cold resistant stainless steel.

11. The arrangement of claim 9, wherein the outer shell of the tank is carbon steel.

12. The arrangement of claim 9, wherein the isolation space between the inner and outer shells of the LNG tank is under vacuum and/or filled with an isolation material.

13. The arrangement of claim 12, wherein the isolation material is perlite or vermiculite.

14. The arrangement of claim 9, comprising:
    an isolation space between the outer wall and the inner wall of the at least one double-walled pipe of stainless steel, and wherein the isolation space of the double-walled pipe is under vacuum and/or filled with an isolation material.

15. The arrangement of claim 14, wherein the isolation material is perlite or vermiculite.

\* \* \* \* \*